United States Patent
Nepple et al.

(10) Patent No.: US 12,456,472 B2
(45) Date of Patent: Oct. 28, 2025

(54) SYSTEM AND METHOD FOR ROUTING AUDIO SIGNALS

(71) Applicant: SKYWORKS SOLUTIONS, INC., Irvine, CA (US)

(72) Inventors: Bruce Charles Nepple, Portland, OR (US); Adam Christopher Braun, Portland, OR (US); Robert L. Mays, Portland, OR (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 236 days.

(21) Appl. No.: 18/368,395

(22) Filed: Sep. 14, 2023

(65) Prior Publication Data

US 2025/0095658 A1    Mar. 20, 2025

(51) Int. Cl.
| | |
|---|---|
| *G10L 19/008* | (2013.01) |
| *G06F 9/48* | (2006.01) |
| *G06F 13/12* | (2006.01) |
| *G06F 13/40* | (2006.01) |
| *G06F 13/42* | (2006.01) |

(52) U.S. Cl.
CPC ............. *G10L 19/008* (2013.01); *G06F 9/48* (2013.01); *G06F 13/12* (2013.01); *G06F 13/40* (2013.01); *G06F 13/4295* (2013.01)

(58) Field of Classification Search
CPC ... G10L 19/008; G06F 13/4295; G06F 13/12; G06F 13/40; G06F 9/48
See application file for complete search history.

(56) References Cited

U.S. PATENT DOCUMENTS

| | | |
|---|---|---|
| 10,476,659 B2 | 11/2019 | Peters, II et al. |
| 2014/0195716 A1 | 7/2014 | Bentz et al. |

FOREIGN PATENT DOCUMENTS

| | | | | |
|---|---|---|---|---|
| WO | WO-9908195 A1 | * | 2/1999 | ........... G06F 13/122 |

* cited by examiner

*Primary Examiner* — Joseph J Lauture
(74) *Attorney, Agent, or Firm* — Lando & Anastasi, LLP

(57) ABSTRACT

A system for processing audio data is disclosed. An example system includes a plurality of input sample rate converters and a plurality of output sample rate converters; an isochronous data interface configured to receive and/or output audio data; a plurality of programmable rate generators configured to trigger a sequence of audio data transfers between the plurality of input sample rate converters and/or the plurality of output sample rate converters and the isochronous data interface; a plurality of transaction control registers configured to control routing for each audio data transfer, the plurality of transaction control registers controlling which input sample rate converter of the plurality of input sample rate converters an audio data transfer is to be transferred from for received audio data; and a plurality of output control registers configured to control write enables of the plurality of output sample rate converters.

18 Claims, 4 Drawing Sheets

SYSTEM AND METHOD FOR ROUTING AUDIO SIGNALS

BACKGROUND

Field

Embodiments of the present disclosure relate to processing-based systems and techniques. In particular, the present disclosure relates to flexible audio data processing systems that can be developed prior to firmware for the system being finalized, thereby shortening the realization time for the audio data processing system.

Description of the Related Technology

Processing of audio data in electronic devices may be used to output a stream of audio data to external devices, such as headphones, headsets, loudspeakers, audio interfaces, and audio mixing consoles and/or to receive a stream of audio data from some such devices. These connections may utilize a wired connection, or alternatively a wireless transceiver may be used to provide a wireless connection to some of these devices.

This may be achieved using a system for processing digital audio data that receives an isochronous data stream at a first sample rate and then buffers and converts the isochronous data stream into a second sample rate using a sample rate converter. In this manner, the system may be used for handing a digital audio data stream and interfacing between a USB host and USB endpoints.

SUMMARY

According to one embodiment there is provided a system for processing audio data, the system comprising (a) a plurality of input sample rate converters and a plurality of output sample rate converters; (b) an isochronous data interface configured to receive and/or output audio data; a plurality of programmable rate generators configured to trigger a sequence of audio data transfers between the plurality of input sample rate converters and/or the plurality of output sample rate converters and the isochronous data interface; (c) a plurality of transaction control registers configured to control routing for each audio data transfer, the plurality of transaction control registers controlling which input sample rate converter of the plurality of input sample rate converters an audio data transfer is to be transferred from for received audio data; and (d) a plurality of output control registers configured to control write enables of the plurality of output sample rate converters.

In one example, the transfer timing of each sequence of audio data transfers between the plurality of input sample rate converters and/or the plurality of output sample rate converters and the isochronous data interface is controlled by a programmable rate generator of the plurality of programmable rate generators.

In one example, each sample rate converter of the plurality of input sample rate converters and the plurality of output sample rate converters is associated with a single programmable rate generator.

In one example, the system may further comprise a plurality of rate generator mapping registers configured to allocate a resource associated with each programmable rate generator of the plurality of programmable rate generators.

In one example, at least one of the plurality of input sample rate converters is a stereo input sample rate converter.

In one example, the system may further comprise a channel selector configured to control the routing of a first channel and a second channel of each audio data transfer received at the stereo input sample rate converter.

According to another embodiment, there is provided a method for processing audio data, the method comprising the steps of (a) triggering, by a plurality of programmable rate generators, a sequence of audio data transfers between an isochronous data interface and a plurality of input sample rate converters and/or a plurality of output sample rate converters, the isochronous data interface configured to receive and/or output audio data; (b) controlling, by a plurality of transaction control registers, the routing for each audio data transfer, and which input sample rate converter of the plurality of input sample rate converters an audio data transfer is to be transferred from for received audio data; and (c) controlling, by a plurality of output control registers, write enables of the plurality of output sample rate converters.

In one example, the method further comprises controlling, by a programmable rate generator of the plurality of programmable rate generators, transfer timing of each sequence of audio data transfers between the plurality of input sample rate converters and/or the plurality of output sample rate converters and the isochronous data interface.

In one example, each sample rate converter of the plurality of input sample rate converters and the plurality of output sample rate converters is associated with a single programmable rate generator.

In one example, the method further comprises allocating, by a plurality of rate generator mapping registers, a resource associated with each programmable rate generator of the plurality of programmable rate generators.

In one example, at least one of the plurality of input sample rate converters is a stereo input sample rate converter.

In one example, the method further comprises controlling, by a channel selector, the routing of a first channel and a second channel of each audio data transfer received at the stereo input sample rate converter. According to another embodiment, there is provided a packaged module comprising (a) a packaging substrate; and (b) a die implemented on the packaging substrate for processing audio data, the die being configured to: (1) trigger, a sequence of audio data transfers between an isochronous data interface and a plurality of input sample rate converters and/or a plurality of output sample rate converters, the isochronous data interface being configured to receive and/or output audio data; (2) control routing for each audio data transfer, and which sample rate converter of the plurality of input sample rate converters an audio data transfer is to be transferred from for received audio data; and (3) control write enables of the plurality of output sample rate converters.

According to another embodiment, there is provided a system for processing audio data, the system comprising: (a) an isochronous data interface configured to output a first stream of audio data; (b) a plurality of output sample rate converters configured to output a second stream of audio data; (c) a plurality of transaction control registers configured to control routing of the first stream of audio data between the isochronous data interface and an output sample rate converter of the plurality of output sample rate converters; (d) a processor configured to remove first header data from the first stream of audio data output from the isochronous data interface and to write the first header data to a circular buffer; (e) a first audio header register configured to control forwarding of the first header data for prepending to the second stream of audio data output by the plurality of output sample rate converters; and (f) a plurality of output control registers configured to control write enables of the plurality of output sample rate converters.

In one example, the system may further comprise a plurality of input sample rate converters configured to receive a third stream of audio data and to output a fourth stream of audio data, the isochronous data interface being further configured to receive the fourth stream of audio data, the plurality of transaction control registers being further configured to control routing of the fourth stream of audio data between an input sample rate converter of the plurality of input sample rate converters and the isochronous data interface.

In one example, the system further comprises a second audio header register configured to control forwarding of second header data for prepending to the fourth stream of audio data received at the isochronous data interface.

In one example, the plurality of transaction control registers are further configured to control which input sample rate converter of the plurality of input sample rate converters an audio data transfer of the fourth stream of audio data is to be transferred from.

In one example, the system further comprises a plurality of programmable rate generators configured to trigger a sequence of audio data transfers between the plurality of output sample rate converters and the isochronous data interface.

In one example, the processor is one of an application-specific integrated circuit, an application-specific instruction set processor, and a field-programmable gate array.

According to another embodiment, there is provided a method for processing audio data, the method comprising the steps of: (a) outputting, by an isochronous data interface, a first stream of audio data; (b) outputting, by a plurality of output sample rate converters, a second stream of audio data; (c) controlling, by a plurality of transaction control registers, routing of the first stream of audio data between the isochronous data interface and an output sample rate converter of the plurality of output sample rate converters; (d) processing, by a processor, first header data to remove the first header data from the first stream of audio data output from the isochronous data interface, and to write the first header data to a circular buffer; (c) controlling, by a first audio header register, forwarding of the first header data for prepending to the second stream of audio data output by the plurality of output sample rate converters; and (f) controlling, by a plurality of output control registers, write enables of the plurality of output sample rate converters.

In one example, the method further comprises: (g) receiving, by a plurality of input sample rate converters a third stream of audio data and (h) outputting, by the plurality of input sample rate converters, a fourth stream of audio data, the isochronous data interface being configured to receive the fourth stream of audio data.

In one example, the method further comprises controlling, by the plurality of transaction control registers, routing of the fourth stream of audio data between an input sample rate converter of the plurality of input sample rate converters and the isochronous data interface.

In one example, the method further comprises controlling, by a second audio header register, forwarding of second header data for prepending to the fourth stream of audio data received at the isochronous data interface.

In one example, the method further comprises controlling, by the plurality of transaction control registers, which input sample rate converter of the plurality of input sample rate converters an audio data transfer of the fourth stream of audio data is to be transferred from.

In one example, the method further comprises triggering, by a plurality of programmable rate generators, a sequence of audio data transfers between the plurality of sample rate converters and the isochronous data interface.

According to another embodiment, there is provided a packaged module comprising (a) a packaging substrate; and (b) a die implemented on the packaging substrate for processing audio data, the die being configured to: (1) output, by an isochronous data interface, a first stream of audio data; (2) output, by a plurality of output sample rate converters, a second stream of audio data; (3) control, by a plurality of transaction control registers, routing of the first stream of audio data between the isochronous data interface and an output sample rate converter of the plurality of output sample rate converters; (4) process, by a processor, first header data to remove the first header data from the first stream of audio data output from the isochronous data interface, and to write the first header data to a circular buffer; (5) control, by a first audio header register, forwarding of the first header data for prepending to the second stream of audio data output by the plurality of output sample rate converters; and (6) control, by a plurality of output control registers, write enables of the plurality of output sample rate converters.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment", "some embodiments", "an alternate embodiment", "various embodiments", "one embodiment", or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
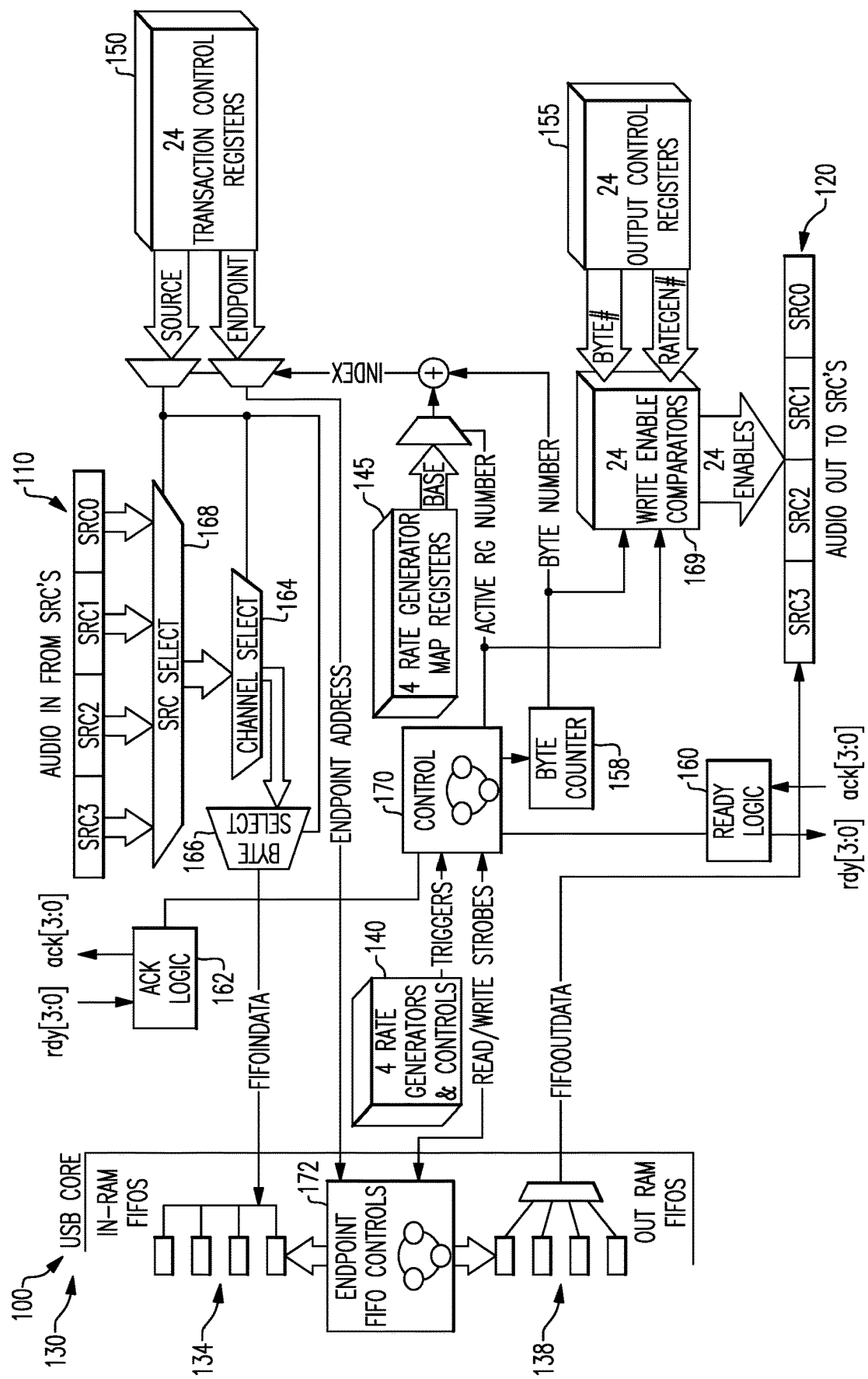
FIG. 1 is a block diagram of a system for processing audio data according to aspects of the present disclosure.

Aspects and embodiments described herein are directed to an improved system for processing digital audio data across universal serial bus (USB) interfaces that provides a high level of flexibility and configurability for adapting to different implementation use cases while minimizing the processing overheads at runtime. For example, this can simplify the configuration and programming of the hardware to different device implementations.

The technique provides a faster time-to-market for microprocessor-based systems by allowing, for example, Application Specific Integrated Circuits (ASICs) comprising microprocessor systems on-chip to be manufactured prior to the final firmware and software being fully developed. Additionally, the subject matter disclosed herein permits changes in the routing of audio data streams and sample rate converter allocation for finalized ASIC designs, thereby allowing finalized ASIC designs greater flexibility and greater system-life lengths. This may be achieved by performing USB re-enumeration to switch between a plurality of different configuration options or profiles in a field configurable/on-the-fly manner.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Processing of digital audio data across universal serial bus (USB) interfaces has typically been implemented using dedicated sample rate converters for given USB endpoints and audio channels. This static, one-to-one, routing of audio data streams to be processed adversely lengthens the realization time for audio data processing systems.

Endpoints can be described as either sources or sinks of data. As the USB bus is a host centric concept (OUT refers to data flow from the USB host to another device, while IN refers to data flow from an external device to the USB host), the endpoints occur at the end of the communications channel at the USB function. At the software layer, a device driver may send a packet to device EP1 for example. As the data is being transferred from the host, it will be gathered in the EP1 OUT buffer. The firmware reads this data based on its own timing, i.e., returning data cannot simply be written to the USB bus by an endpoint because the USB bus is controlled by the USB host. Accordingly, the data written to the EP1 IN buffer sits there until the USB host sends an IN packet to that endpoint requesting the data. Endpoints can also be seen as the interface between the hardware of the function device and the firmware running on the function device.

The transfer of audio data streams in the USB specification is typically implemented using isochronous data transfers that occur continuously and periodically to convey the time sensitive digital audio data stream between the interfaced components. Isochronous data transfers are known to provide guaranteed access to USB bandwidth, bounded latency, and a unidirectional stream pipe.

The maximum size data payload is specified in the USB endpoint descriptor of an isochronous endpoint. In current implementations of the USB specification, this can be up to a maximum of 1023 bytes for a full-speed device and 1024 bytes for a high speed device. In full-speed operation up to one packet may typically be received and transmitted per endpoint per millisecond, thus the maximum packet size indicates the maximum memory needed by any endpoint over the duration of 1 millisecond. For OUT endpoints (i.e., endpoints receiving data from a USB host), the maximum packet size can be one sample per channel greater than the nominal frequency rounded down. For example, a 44.1 kHz stream can have up to 45 samples per packet; while a 96.0 kHz stream can have up to 97 samples per packet.

The total number of output and input isochronous endpoints, as well as the split of output/input endpoints will vary depending on the use case for a particular audio data processing system; however, the inventors have appreciated that, by designing a microprocessor system-on-chip (SoC) having flexible assignments for endpoint data flow, a maximum use case may be determined and used in the design and manufacture of the SoC so that the design and manufacture stages can be completed prior to the final firmware and software being fully configured for a given use case.

FIG. 1 illustrates one example of a system 100 for processing audio data, in particular for routing audio data from a desired isochronous OUT USB endpoint to a desired sample rate converter and conversely for routing audio data from a desired sample rate converter to a desired isochronous IN USB endpoint. The system 100 comprises a plurality of input sample rate converters (SRCs) 110, a plurality of output sample rate converters 120, and a USB core 130 of a USB host or peripheral. The USB core 130 comprises a plurality of input side First-In-First-Out (FIFO) buffer Random Access Memories (RAMs) 134 and a plurality of output side FIFO RAMs 138.

The USB core 130 has a data interface that is configured for sending and receiving audio data by isochronous data transfer. The sequence of these audio data transfers between the sample rate converters 110, 120 and the isochronous data interface of the USB core 130 are controlled by a plurality of programmable rate generators 140. The programmable rate generators 140 trigger the start of the transfer of a sample of audio data, then data is transferred each clock signal (typically one byte of data is transferred per clock) until the complete sample has been transferred.

In order to provide flexible assignments for the endpoint data flow, an embodiment of the present disclosure controls the routing of the audio data using a plurality of rate generator mapping registers 145 and a plurality of transaction control registers 150. The rate generator mapping registers 145 allocate the resources associated with each programmable rate generator of the plurality of programmable rate generators 140. The programmable rate generators 140 each trigger the sequence of byte transfers until the sample is complete. The skilled person will appreciate that the present disclosure may be utilized for the processing of samples having many different bit sizes and bitrates per channel.

For example, common channel bit depths/sizes for audio samples may be considered to be 8-bits, 16-bits, or 24-bits. In the case of a 24-bit stereo audio sample (i.e., across two channels), there will be 48 bits per stereo audio sample and therefore there will be 6 bytes of data to be transferred to complete the stereo audio sample. This is typically transferred in 6 transfers across 6 consecutive programmable rate generator triggers. A base index for the particular programmable rate generator 140 that is controlling the transfer may point into the transaction routing controls in the transaction control register and a byte counter 158 may be incremented by one for each byte of audio data that is transferred.

Programmable rate generators of the plurality of programmable rate generators 140 are each associated with one or more sample rate converters 110, 120 that are involved in the transfer, e.g., to facilitate the handshake control logic; however, each sample rate converter 110, 120 can only be associated with a single programmable rate generator. Programmable rate generators are either associated with USB OUT transfers or USB IN transfers, and accordingly all sample rate converters could be controlled by a single programmable rate generator in the event that the sample rate converters were all processing USB OUT audio data transfers, or alternatively all processing USB IN audio data transfers.

Where data is being sent out from the USB core 130 to the output sample rate converters 120, the output sample rate converters may be notified once the complete sample is ready for transfer using ready logic 160 in the typical manner. Alternatively, where data is being received externally from the input sample rate converters 110 and then to be received at the USB core 130. the input sample rate converters may be acknowledged for audio input and subsequent transfer to the USB core using acknowledgement logic 162 in the typical manner.

For USB OUT transfers, the plurality of transaction control registers 150 identify the endpoint addresses for each byte of data to be transferred. The output control register 155 associated with the output sample rate converter 120 may be configured to control the write enable comparators 169 for the output sample rate converters. As a byte of data is read from the endpoint indicated by an index in the transaction control register 150, any output control register 155 that has a programmable rate generator number and byte count that matches the active programmable rate generator and current byte count indicated may be loaded with the endpoint's data byte. In some embodiments, if the byte count is set to a given value, the location will be loaded with a zero when the byte count is also zero. This provides a way to zero out unused bytes, e.g., the least significant bit for some sample transfers.

As an example, if embodiments of the present disclosure are implemented in a system having four output sample rate converters 120, each output sample rate converter operating in stereo (i.e., handling two channels), then the total number of bytes at any one point in time in a 24-bit depth implementation would be 24 bytes (24 bit/8 bits in a byte*2 channels*4 sample rate converters). If a first programmable rate generator is active for a 6 byte USB OUT sample and the byte counter was currently set to four, then each of the output control registers programmed to 1-4 may be written, with the audio data being read from the endpoint specified at (byte counter+base index) in the first programmable rate generator in the transaction control register 150.

For USB IN transfers, the plurality of transaction control registers 150 identify the endpoint addresses for each byte of data to be transferred as well as the specific byte in an input sample rate converter that is to be transferred. In this case, the transaction control register 150 defines which byte of an input sample rate converter is to be transferred into the specified endpoint FIFO RAM buffer. For example, for a stereo sample rate converter, the indexed register may specify that byte 0 of the first (e.g., left) channel of the first input sample rate converter 110 is to be transferred to a particular endpoint. In such an embodiment, a channel select control 164, a byte select control 166, and a sample rate converter select control 168 may be used to route each byte of audio from a stereo sample rate converter to the correct endpoint. For example, the audio passed through the stereo sample rate converter need not correspond to a stereo audio data feed, and may instead correspond to two separate mono audio data feeds to be processed by the stereo sample rate converter and routed to corresponding separate mono endpoints. To support this, the programmable rate generators 140 are preferably independently mappable to given endpoints, with mono USB IN endpoints being able to be enumerated at the same rates. It will be appreciated that in embodiments in which the sample rate converters 110 are each mono sample rate converters, the channel select control 164 would not be required.

The processing of the audio data by the above described system may be controlled by one or more control state machines 170, 172.

In the example illustrated in FIG. 1, the system 100 is provided with four sample rate converters 110, 120, four rate generators 140, four rate generator map registers 145, twenty four transaction control registers 150, twenty four output control registers 155, and twenty four write enable comparators 169. However, it will be appreciated that these numbers may be varied in alternative implementations, and that these example numbers/ratios do not limit the scope of the present disclosure.

In one example, the system 100 may be configured to map 16 endpoints. For example, one of the endpoints may be used for incoming and outgoing control signals, eleven endpoints could be used for incoming and outgoing bulk data transfers or interrupt data transfers, and a further four endpoints could be used for incoming and outgoing isochronous data transfers. Endpoints used for isochronous data transfer may be configured to have a 10-bit or 11-bit byte counter in one example. This means that byte allocations can be adjusted to handle larger packet sizes. Buffer addresses and maximum packet size values may be configured in accordance with the USB rules for the mode of operation, for example the rules for USB full-speed.

While FIG. 1 is directed to a system 100 for a single USB device implementation, it will be appreciated that the present disclosure is not limited to this scenario and that the system 100 could be adapted to facilitate multiple devices. For example, the controller 170 may be expandable to control the interface between multiple devices in a USB composite device, which may be considered to be a virtual USB hub. This may be achieved by adding in a device map register to handle the routing of the audio data signals to/from the composite device.

Figure 2:
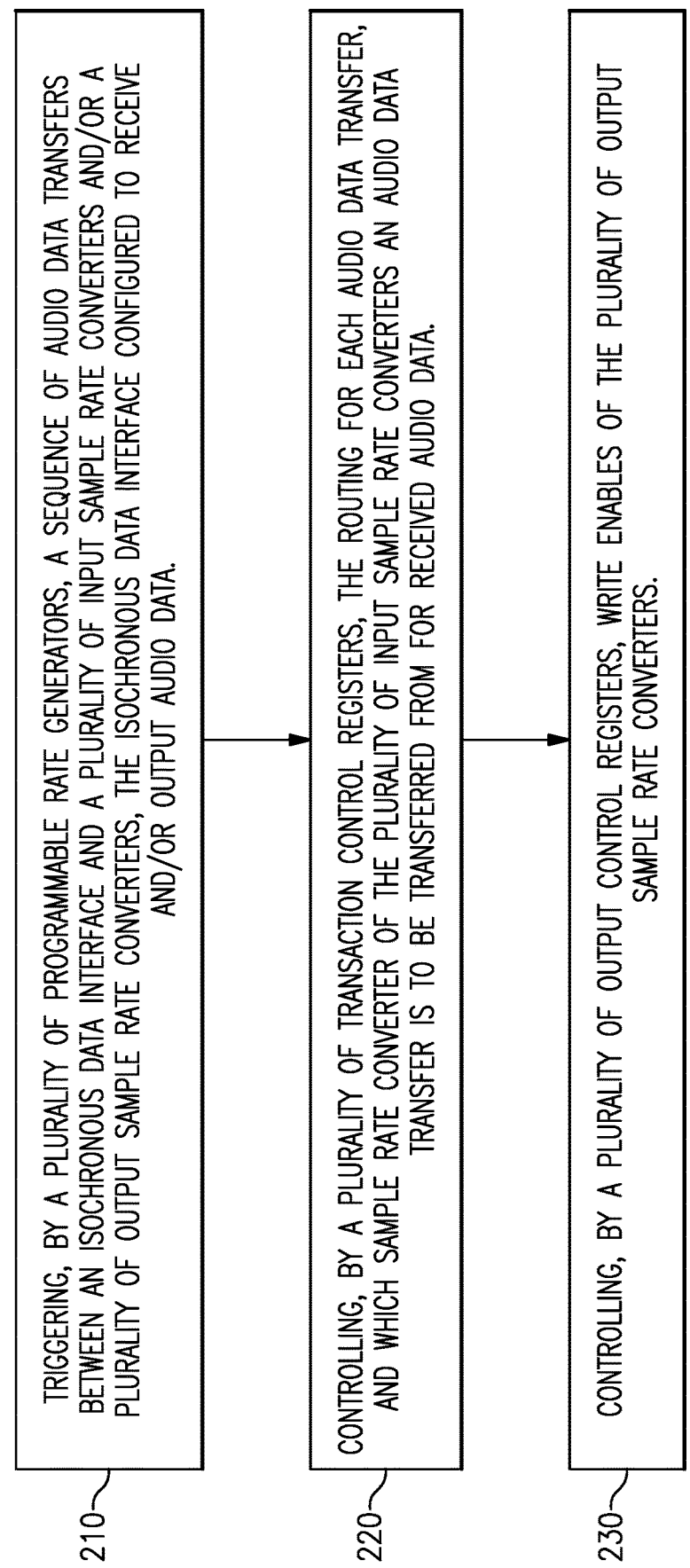
FIG. 2 is a flowchart illustrating an example method for processing audio data according to aspects of the present disclosure.

In a further aspect of the present disclosure, a method according to FIG. 2 is provided for processing audio data with configurable routing. At step 210, the method comprises triggering, by a plurality of programmable rate generators, a sequence of audio data transfers between an isochronous data interface and a plurality of input sample rate converters and/or a plurality of output sample rate converters, the isochronous data interface being configured to receive and/or output audio data. Then, at step 220 the method comprises controlling, by a plurality of transaction control registers, the routing for each audio data transfer, and which sample rate converter of the plurality of input sample rate converters an audio data transfer is to be transferred from for received audio data. Then, at step 230 the method comprises controlling, by a plurality of output control registers, write enables of the plurality of output sample rate converters.

In this manner, the method acts to route outgoing audio data bytes from the desired USB isochronous (ISOC) OUT endpoint to a desired sample rate converter, and to route incoming audio data bytes from the desired sample rate converter to the desired USB isochronous (ISOC) IN endpoint. The transfer timing for the data bytes is controlled using the programmable rate generators to trigger the start of a transfer of a sample. Once this transfer is active, data can be transferred each clock cycle (for example one byte of data being transferred per clock) until the sample is completed. For incoming audio data (USB_IN) the sample rate converters involved in the transfer are then acknowledged to confirm receipt of the data, and for outgoing audio data (USB_IN) the sample rate converters to receive the audio data are then notified that a sample of audio data is ready to be transferred.

This approach provides processing of audio data across USB interfaces that may be easier to program while providing a high level of flexibility and configurability for adapting to different implementation use cases while minimizing the processing overheads at runtime. For example, this can simplify the configuration and programming of the hardware to different device implementations. Reconfiguration of the routing may be achieved by updating the values of the registers. The registers may store multiple set of values/profiles that can be selected between to change the configuration of the audio processing method and system. In one example, changes between stored profiles may be instructed by receipt of a command over USB such that the system may be reconfigured on-the-fly. This may be achieved by USB re-enumeration rather than flashing the firmware.

In some examples, a programmable rate generator of the plurality of programmable rate generators may be configured to control the transfer timing of each sequence of audio data transfers between the sample rate converters and the isochronous data interface.

In other examples, a plurality of rate generator mapping registers may be configured to allocate a resource associated with each programmable rate generator of the plurality of programmable rate generators.

In further examples, a channel selector may be configured to control the routing of a first channel and a second channel of each audio data transfer received at the stereo input sample rate converter. This enables two mono tracks of audio data to be processed by a single stereo input sample rate converter, with appropriate routing to and from the sample rate converter.

In a further embodiment of the present disclosure, the system 100 for processing audio data may be adapted to handle audio data comprising header data. This header may be included on each packet of the relevant data stream in order to packetize the included data. In the following discussion, the example of gaming input protocol (GIP) headers, which are sometimes referred to as gaming interface protocol headers, will be considered; however, the skilled person will appreciate that this teaching can also be applied to any other header data that may by prepended to the audio data stream. The GIP headers may include Output headers (e.g., for USB isochronous audio OUT) and Input headers (e.g., for USB isochronous audio IN) headers prepended to the USB isochronous Audio Streams. GIP Output Headers may be buffered by hardware and can be read by the processor. GIP Input headers may be defined by the processor and automatically prepended to the isochronous IN audio data stream.

GIP headers are typically included on each packet of the relevant data stream in order to packetize the included data; however, this can lead to a high processing load on associated firmware, which is undesirable. Accordingly, adaptations to the system 100 may be configured to strip GIP headers out of an audio data stream, and/or to insert such GIP headers into an audio data stream as required. Once removed, these GIP headers are buffered and then forwarded at generation stage for reintroduction into the converted audio data stream.

The ability to add or remove GIP headers from the audio data stream in this manner can be achieved using specialized hardware and therefore conventional/general processor intervention or overhead is not required. This advantageously acts to limit the firmware overhead at runtime. The specialized hardware component(s) may be implemented as an application-specific integrated circuit (ASIC), an application-specific instruction set processor (ASIP), or a field-programmable gate array (FPGA), and may generally be referred to as a processor. This specialized hardware processor may include one or more of a GIP control register, a GIP audio output header register, and/or a GIP audio input header register. A single endpoint may be configured to handle incoming and outgoing GIP headers. This endpoint may need a slightly larger byte allocation to account for the GIP headers. Alternatively, multiple endpoints may be configured to handle GIP headers in some embodiments. In various examples, a configuration file may be loaded onto the specialized hardware processor to adapt the system 100 from one use case to another.

In an isochronous audio out stream, GIP audio output header registers may be configured to remove GIP Audio Output Headers from the audio stream. The removed headers may be stored in a circular buffer and the remainder of the audio out stream being forwarded on for further processing. In one example, the circular buffer may be implemented using a bank of five 6-byte buffers. The corresponding registers may be loaded as the audio data is streamed, auto-advancing to the next 6-byte bank for each packet or frame that is transferred. Since this embodiment uses a circular buffer, the data in the buffer will be overwritten with new data after five packets or frames of audio data have been processed.

The header length is decoded as the packet is received in order that the proper numbers of bytes are stripped from each packet and made available to a processor for processing. In one example, the five circular GIP buffers may be accessed through five pairs of 32-byte registers. The buffer number loaded in the previous frame may be made available to the processor in the GIP control register to facilitate indexing into a register bank. The formatting of the audio output data messages may be in accordance with the GIP specification. In one example, the packet numbers may be automatically checked during processing.

In an isochronous audio IN stream, GIP audio input header registers may be configured to prepend GIP Audio Input Headers to isochronous audio IN packets of the audio stream. The number of prepended bytes may be controlled by a GIP control register, and the prepended data may be sourced from the GIP audio input header registers. The bytes prepended to the isochronous audio IN stream are those set by the processor in the GIP audio input header register bank, with the exception of a counter byte, which auto-advances after each start of frame. The packet numbers may be automatically generated and incremented. The counter value typically starts at a value set by the processor before transfers begin. In this manner, reading the counter byte will provide the number of the current frame. The formatting of GIP audio input data messages may be in accordance with the GIP specification.

In one implementation, the longest possible GIP Audio Input Header may be 9 bytes long (given a 4 byte length value); however, since USB is typically limited to a 1023 byte maximum full-speed isochronous packet size, the maximum length value can be expected to be 0x3FF. This maps to 0xFF 0x07, which is 2 bytes long. This means that the maximum header size may be 7 bytes and the minimum header size may be 6 bytes in such an example.

Figure 3:
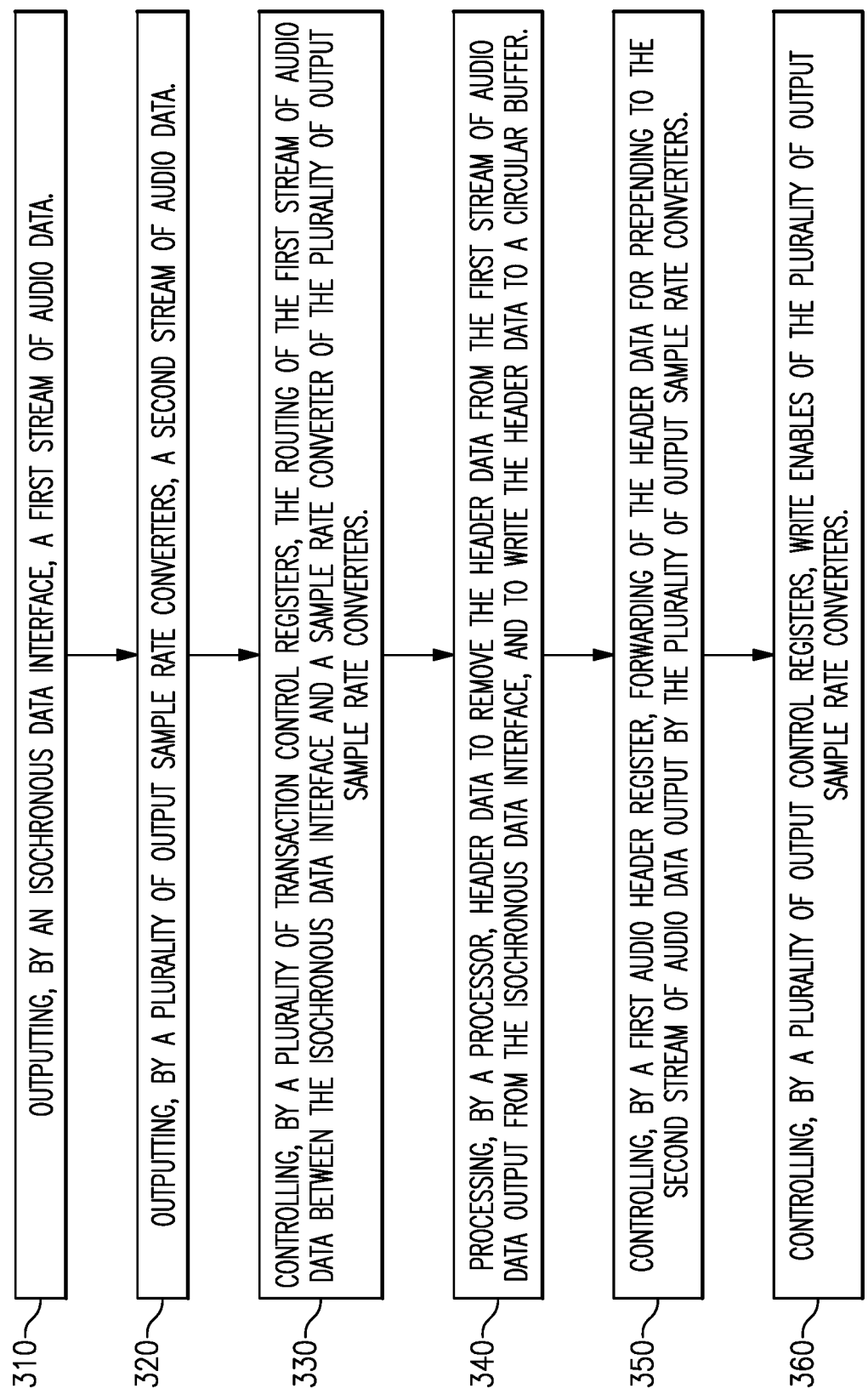
FIG. 3 is a flowchart illustrating an example method for processing audio data having headers according to aspects of the present disclosure.

In a further aspect of the present disclosure, a method according to FIG. 3 is provided for processing audio data having headers with configurable routing. At step 310, the method comprises outputting, by an isochronous data interface, a first stream of audio data. At step 320, the method comprises outputting, by a plurality of output sample rate converters, a second stream of audio data. Then, at step 330 the method comprises controlling, by a plurality of transaction control registers, the routing of the first stream of audio data between the isochronous data interface and a sample rate converter of the plurality of output sample rate converters. At step 340, the method comprises processing, by a processor, header data to remove the header data from the first stream of audio data output from the isochronous data interface, and to write the header data to a circular buffer. At step 350, the method comprises controlling, by a first audio header register, forwarding of the header data for prepending to the second stream of audio data output by the plurality of output sample rate converters. Then, at step 360 the method comprises controlling, by a plurality of output control registers, write enables of the plurality of output sample rate converters.

In this manner, the method acts to remove header data from audio data being transmitted between the USB isochronous data interface for the OUT endpoint and the output sample rate converters so that the flexible routing of the audio data to the output sample rate converters and efficient processing of the audio data by the desired sample rate converter can be provided for audio data having headers, such as GIP headers.

For USB IN audio data, the stream of audio data may be received at the plurality of input sample rate converters, with a modified stream of audio data being output by the input sample rate converters for transmission to the USB isochronous data interface. The plurality of transaction control registers may be configured to control the routing of the modified audio data stream between a sample rate converter of the plurality of input sample rate converters and the USB isochronous data interface. An audio header register may control the forwarding of header data for prepending to the modified stream of audio data received at the isochronous data interface. The plurality of transaction control registers may control which sample rate converter of the plurality of input sample rate converters an audio data transfer of the modified stream of audio data is to be transferred from.

For completeness, it is noted that the flowcharts of FIG. 2 and FIG. 3 illustrates the operation of example implementations of methods according to the present disclosure. Each block in the flowcharts may represent a module comprising one or more executable computer instructions, or a portion of an instruction, for implementing the relevant logical function specified in the block. The orders of blocks in FIG. 2 and FIG. 3 are only intended to be illustrative of respective examples. In alternative implementations, the logical functions illustrated in particular blocks may occur out of the order noted in FIG. 2 and FIG. 3. For example, the processes associated with two blocks may be carried out simultaneously or, depending on the functionality, in the reverse order. Moreover, each block in the flowcharts may be implemented in software, hardware or a combination of software and hardware.

Figure 4:
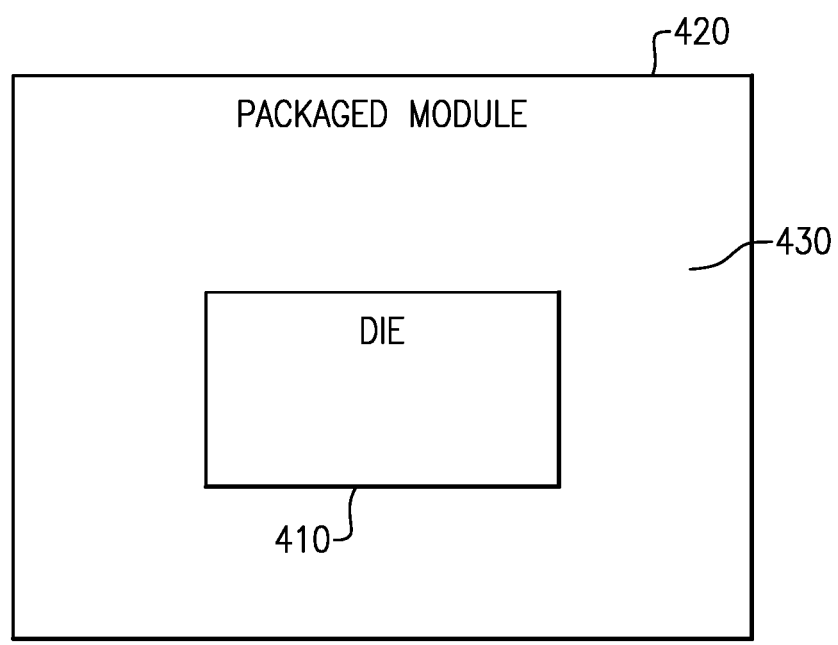
FIG. 4 illustrates a die implemented in a packaged module having one or more features according to aspects of the present disclosure.

FIG. 4 illustrates a die 410 implemented in a packaged module 420. Such a packaged module can include a packaging substrate 430 configured to receive a plurality of components. In one example, the packaging substrate may be configured to receive one or more microprocessor system-on-chip having one or more features described herein. In one example the packaged module 420 may be a front end module for sending or receiving audio data streams along over-the-air channels. In some examples, the packaging substrate 430 may be configured to receive further components such as an RF power amplifier (PA), one or more RF filters, and/or a low noise amplifier (LNA). The packaged module may be implemented in a single-sided or double-sided molded package. In other examples, a wafer-level chip scale package (WL-CSP) may be used to receive the plurality of components.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A system for processing audio data, the system comprising:
   a plurality of input sample rate converters and a plurality of output sample rate converters;
   an isochronous data interface configured to receive and/or output audio data;
   a plurality of programmable rate generators configured to trigger a sequence of audio data transfers between the plurality of input sample rate converters and/or the plurality of output sample rate converters and the isochronous data interface;
   a plurality of transaction control registers configured to control routing for each audio data transfer, the plurality of transaction control registers controlling which input sample rate converter of the plurality of input sample rate converters an audio data transfer is to be transferred from for received audio data; and
   a plurality of output control registers configured to control write enables of the plurality of output sample rate converters.

2. The system of claim 1 wherein transfer timing of each sequence of audio data transfers between the plurality of input sample rate converters and/or the plurality of output sample rate converters and the isochronous data interface is controlled by a programmable rate generator of the plurality of programmable rate generators.

3. The system of claim 1 wherein each sample rate converter of the plurality of input sample rate converters and the plurality of output sample rate converters is associated with a single programmable rate generator.

4. The system of claim 1 further comprising a plurality of rate generator mapping registers configured to allocate a resource associated with each programmable rate generator of the plurality of programmable rate generators.

5. The system of claim 1 wherein at least one of the plurality of input sample rate converters is a stereo input sample rate converter.

6. The system of claim 5 further comprising a channel selector configured to control the routing of a first channel and a second channel of each audio data transfer received at the stereo input sample rate converter.

7. A method for processing audio data, the method comprising the steps of:
triggering, by a plurality of programmable rate generators, a sequence of audio data transfers between an isochronous data interface and a plurality of input sample rate converters and/or a plurality of output sample rate converters, the isochronous data interface configured to receive and/or output audio data;
controlling, by a plurality of transaction control registers, routing for each audio data transfer, and which input sample rate converter of the plurality of input sample rate converters an audio data transfer is to be transferred from for received audio data; and
controlling, by a plurality of output control registers, write enables of the plurality of output sample rate converters.

8. The method of claim 7 further comprising controlling, by a programmable rate generator of the plurality of programmable rate generators, transfer timing of each sequence of audio data transfers between the plurality of input sample rate converters and/or the plurality of output sample rate converters and the isochronous data interface.

9. The method of claim 7 wherein each sample rate converter of the plurality of input sample rate converters and the plurality of output sample rate converters is associated with a single programmable rate generator.

10. The method of claim 7 further comprising allocating, by a plurality of rate generator mapping registers, a resource associated with each programmable rate generator of the plurality of programmable rate generators.

11. The method of claim 7 wherein at least one of the plurality of input sample rate converters is a stereo input sample rate converter.

12. The method of claim 11 further comprising controlling, by a channel selector, the routing of a first channel and a second channel of each audio data transfer received at the stereo input sample rate converter.

13. A packaged module comprising:
a packaging substrate; and
a die implemented on the packaging substrate for processing audio data, the die being configured to:
trigger, a sequence of audio data transfers between an isochronous data interface and a plurality of input sample rate converters and/or a plurality of output sample rate converters, the isochronous data interface being configured to receive and/or output audio data;
control routing for each audio data transfer, and which sample rate converter of the plurality of input sample rate converters an audio data transfer is to be transferred from for received audio data; and
control write enables of the plurality of output sample rate converters.

14. The packaged module of claim 13 wherein the die is further configured to control, by a programmable rate generator, transfer timing of each sequence of audio data transfers between the plurality of input sample rate converters and/or the plurality of output sample rate converters and the isochronous data interface.

15. The packaged module of claim 13 wherein each sample rate converter of the plurality of input sample rate converters and the plurality of output sample rate converters is associated with a single programmable rate generator.

16. The packaged module of claim 13 wherein the die is further configured to allocate, by a plurality of rate generator mapping registers, a resource associated with each programmable rate generator of a plurality of programmable rate generators.

17. The packaged module of claim 13 wherein at least one of the plurality of input sample rate converters is a stereo input sample rate converter.

18. The packaged module of claim 17 wherein the die is further configured to control, by a channel selector, the routing of a first channel and a second channel of each audio data transfer received at the stereo input sample rate converter.

* * * * *